United States Patent
Tyrell

(10) Patent No.: US 9,187,664 B2
(45) Date of Patent: Nov. 17, 2015

(54) INKJET INK COMPOSITION CONTAINING ANTI-KOGATION AGENTS

(75) Inventor: Paul Tyrell, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 339 days.

(21) Appl. No.: 13/258,891

(22) PCT Filed: Dec. 21, 2009

(86) PCT No.: PCT/US2009/068977
§ 371 (c)(1),
(2), (4) Date: Sep. 22, 2011

(87) PCT Pub. No.: WO2011/078842
PCT Pub. Date: Jun. 30, 2011

(65) Prior Publication Data
US 2012/0249661 A1    Oct. 4, 2012

(51) Int. Cl.
| | |
|---|---|
| *B41J 2/015* | (2006.01) |
| *C09D 11/38* | (2014.01) |
| *C09D 11/30* | (2014.01) |
| *C09D 11/322* | (2014.01) |
| *C09D 11/52* | (2014.01) |
| *B41J 2/21* | (2006.01) |

(52) U.S. Cl.
CPC .............. *C09D 11/38* (2013.01); *B41J 2/2107* (2013.01); *C09D 11/30* (2013.01); *C09D 11/322* (2013.01); *C09D 11/52* (2013.01)

(58) Field of Classification Search
CPC ........ C09D 11/38; C09D 11/30; C09D 11/52; C09D 11/40; C09D 11/322; B41J 2/2107
USPC ............................ 347/20, 95–100; 106/31.6
See application file for complete search history.

(56) References Cited

U.S. PATENT DOCUMENTS

| | | | |
|---|---|---|---|
| 5,792,249 A | 8/1998 | Shirota et al. | |
| 5,972,087 A | 10/1999 | Uraki et al. | |
| 6,031,019 A | 2/2000 | Tsutsumi et al. | |
| 6,610,129 B1 | 8/2003 | Sader et al. | |
| 6,758,559 B1 | 7/2004 | Nakano et al. | |
| 7,052,536 B2 | 5/2006 | Yatake | |
| 7,229,489 B2 | 6/2007 | Yatake | |

(Continued)

FOREIGN PATENT DOCUMENTS

| | | | |
|---|---|---|---|
| CN | 101522831 A | 9/2009 | |
| EP | 1142968 A1 | 10/2001 | |

(Continued)

OTHER PUBLICATIONS

Supplemental European Search Report from European Patent Office dated Nov. 8, 2013 (3 pages) for counterpart EP application EP09852669.

(Continued)

*Primary Examiner* — Matthew Luu
*Assistant Examiner* — Rut Patel
(74) *Attorney, Agent, or Firm* — Hewlett-Packard Patent Department

(57) ABSTRACT

Ink compositions and methods of using the same are disclosed. An example ink composition includes an inkjet vehicle, from about 0.1 wt % to about 10 wt % of colorants, from about 0.01 wt % to about 10 wt % of anti-kogation agents, and from about 0.01 wt % to about 6 wt % of a water soluble component represented by formula (I).

17 Claims, 1 Drawing Sheet

(56) References Cited

U.S. PATENT DOCUMENTS

| | | |
|---|---|---|
| 7,273,898 B2 | 9/2007 | Yatake |
| 7,370,952 B2 | 5/2008 | Inoue et al. |
| 8,770,736 B2 * | 7/2014 | Vasudevan et al. ........... 347/100 |
| 2002/0162481 A1 | 11/2002 | Rehman et al. |
| 2004/0055507 A1 | 3/2004 | Uhlir-Tsang et al. |
| 2004/0070654 A1 | 4/2004 | Taguchi et al. |
| 2004/0186200 A1* | 9/2004 | Yatake ........................ 523/160 |
| 2005/0225615 A1* | 10/2005 | Sader et al. .................... 347/95 |
| 2007/0225400 A1 | 9/2007 | Schmid et al. |
| 2007/0240608 A1 | 10/2007 | Ogawa |
| 2008/0043079 A1 | 2/2008 | Ikeda et al. |
| 2008/0070008 A1 | 3/2008 | Namba et al. |
| 2009/0123768 A1 | 5/2009 | Scholte et al. |

FOREIGN PATENT DOCUMENTS

| | | |
|---|---|---|
| EP | 1 403 345 A1 | 3/2004 |
| EP | 1403339 A1 | 3/2004 |
| JP | 2001323197 A | 11/2001 |
| JP | 2002332443 A | 11/2002 |
| JP | 2004123904 A | 4/2004 |
| WO | 2008043984 A1 | 4/2008 |
| WO | 2009078833 A1 | 6/2009 |

OTHER PUBLICATIONS

International Search Report for International Application No. PCT/US2009/068977 mailed on Sep. 17, 2010.

Written Opinion for International Application No. PCT/US2009/068977 dated Sep. 16, 2010.

Japan Office Action (JPOA) and List of References Cited from the Japan Patent Office for counterpart application No. 2012-545917 in Japan, 4 pages, dated Sep. 3, 2013 (English translation).

First Office Action and Search Report from the State Intellectual Property Office of P.R. China (CNOA) for counterpart application No. 200980162531.8 in P.R. China, 9 pages, dated Aug. 2, 2013 (English translation).

* cited by examiner

INKJET INK COMPOSITION CONTAINING ANTI-KOGATION AGENTS

BACKGROUND

The use of inkjet printing systems has grown dramatically in recent years, which is attributed to substantial improvements in print resolution and overall print quality coupled with appreciable reduction in cost. Notwithstanding their recent success, intensive research and development efforts continue toward improving inkjet print quality, while further lowering cost to the consumer.

With inkjet printing, a desired printed image is formed when a precise pattern of dots is ejected from a drop-generating device, known as a printhead, onto a print medium. The printhead has an array of precisely formed nozzles located on a nozzle plate and attached to an inkjet printhead substrate. The inkjet printhead substrate incorporates an array of firing chambers that receive inkjet ink through fluid communication with one or more ink reservoirs. Each firing chamber has a resistor element, known as a firing resistor, located opposite the nozzle so that the inkjet ink collects between the firing resistor and the nozzle. Each resistor element is typically a pad of a resistive material and measures about 35 µm×35 µm. The printhead is held and protected by an outer packaging referred to as a print cartridge or an inkjet pen. Upon energizing of a particular resistor element, a droplet of inkjet ink is expelled through the nozzle toward the print medium. The firing of ink droplets is typically under the control of a microprocessor, the signals of which are conveyed by electrical traces to the resistor elements, forming alphanumeric and other characters on the print medium. The small scales of the nozzles, which are typically 10 µm to 40 µm in diameter, require that the ink does not clog the nozzles. However, repeated firings of the resistor elements, which are designed to withstand millions of firings over the life of the print cartridge, result in fouling of the resistor elements with residue and degradation of pen performance. This build up of residue is known as kogation. The term "kogation" is, thus, used herein to refer to the buildup of the residue, or koga, on a surface of the resistor element in the inkjet pen.

To produce high quality images, the inkjet ink has to be compatible with the inkjet pen and the print medium. In addition, the ink has to be capable of passing through the inkjet orifice without clogging the orifice plate.

Inkjet ink typically includes one or more colorants dissolved or dispersed in an aqueous-based ink vehicle and can also contain anti-kogation components. Such anti-kogation components have been used to counter the kogation effect. However, such components tend to be not stable in the ink composition and often precipitate. Such precipitation phenomenon results in a deposition phenomenon which tend clog the nozzle of the print head Clogging of ink occurs when ink drops, exiting the orifices, leave behind minute amounts of ink on the orifice plate around each orifice. The inkjet ink collects on an outer surface of the orifice plate or puddles adjacent to the edge of the orifice. Such clogging happens at the fore end of the narrow nozzle so that the direction and quantity of ink jetted become unstable. This clogging effect results in that the size and the speed of ink drops vary exceedingly whereby it becomes impossible to obtain a clear record and jet printing is hampered. This phenomena result thus in poor printing performances.

Clogging naturally happen on inks, however, this phenomenon is accentuated by precipitation of some components of ink composition, such as anti-kogation components, and furthermore, is accentuated when metal ions contaminate ink composition.

It has thus often created challenges to formulate ink compositions which do not have a kogation effect and which do not result in clogging the nozzle of the printing machine; in other words, which can be effectively used with inkjet printing techniques and which provide good image printing performances.

BRIEF DESCRIPTION OF THE DRAWINGS

In order to better understand the present disclosure, some embodiments will be described below by way of non-limiting examples only, with reference to figures, wherein.

DETAILED DESCRIPTION

Figure 1:
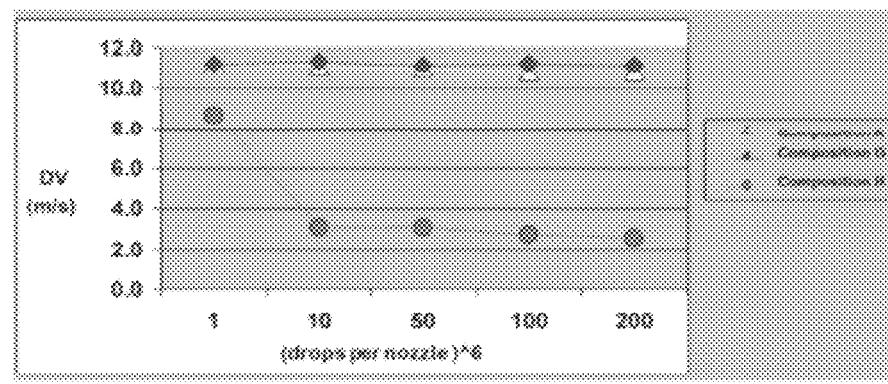
FIG. 1 is a comparative graph representing ink drop velocity in relation with drops/nozzle for ink compositions according to embodiments of the present disclosure.

Embodiments of the present disclosure will employ, unless otherwise indicated, techniques of synthetic organic chemistry, ink chemistry, media chemistry, printing chemistry, and the like, that are within the skill of the art. Such techniques are explained fully in the literature. The following examples are put forth to provide those of ordinary skill in the art with a complete disclosure and description of how to perform the methods and use the compositions disclosed and claimed herein. Efforts have been made to ensure accuracy with respect to numbers (e.g., amounts, temperature, etc.) but some errors and deviations should be accounted for. Unless indicated otherwise, temperature is in ° C., and pressure is at or near atmospheric. Standard temperature and pressure are defined as 20° C. and 1 atmosphere. Unless indicated otherwise, the viscosity is expressed in cP and is measured at a temperature of 25° C.

Before embodiments of the present disclosure are described in detail, it is to be understood that, unless otherwise indicated, the present disclosure is not limited to particular materials, and processes disclosed herein as such may vary to some degree. It is also to be understood that the terminology used herein is for purposes of describing particular embodiments only, and is not intended to be limiting, as the scope of the present invention will be defined only by the appended claims and equivalents thereof.

In the present specification, and in the appended claims, the following terminology will be used: the singular forms "a", "an", and "the" include plural referents unless the context clearly dictates otherwise. Thus, for example, reference to "a support" includes a plurality of supports. The terms "about" and "approximately," when referring to a numerical value or range is intended to encompass the values resulting from experimental error that can occur when taking measurements. Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 weight percentage (wt %) to about 20 weight percentage (wt %) should be interpreted to include not only the explicitly recited concentration limits of 1 wt % to approximately 20 wt %, but also to include individual concentrations such as 2 wt %, 3 wt %, 4 wt %, and sub-ranges such as 5 wt % to 15 wt %, 10 wt % to 20 wt %, etc.

As used herein, "images" refers to marks, signs, symbols, figures, indications, and/or appearances deposited upon a material or substrate with either visible or an invisible ink composition. Examples of an image can include characters, words, numbers, alpha-numeric symbols, punctuation, text, lines, underlines, highlights, and the like.

In some embodiments, the inkjet ink composition includes an inkjet vehicle, from about 0.1 weight percentage to about 10 weight percentage of colorants, from about 0.01 weight percentage to about 10 weight percentage of anti-kogation agents and from about 0.01 weight percentage to about 6 weight percentage of a water soluble component. The water soluble component is represented by the formula (I) below, wherein $R^1$ and $R^2$ are independently $C_nH_{2n}$ with n being from 1 to 5; wherein $R^3$ is H or $C_nH_{2n+1}$ with n being from 1 to 4; wherein $R^4$ is H, COOH or $C_nH_{2n+1}$ with n being from 1 to 4 and wherein $R^5$ is H, COOH, OH, H, $C_nH_{2n}$COOH or $C_nH_{2n+1}$ with n being from 1 to 4.

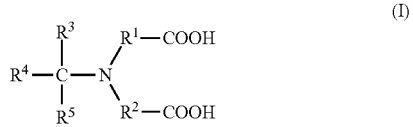

(I)

In some embodiments, the ink composition is an inkjet ink printing composition. By inkjet composition, it is meant herein that the composition is very well adapted to be used in an inkjet device and in an inkjet printing process. In other words, the ink composition is suitable for inkjet ink printing.

It has likewise been observed that ink compositions often tend to suffer from kogation of resistors, resulting in shortened lifetime of the printhead and decreased print quality at earlier stages in the life of the printhead. Anti-kogation elements have often been used to avoid such kogation problems. However, inks containing such anti-kogation elements tend to suffer from clogging problems. Indeed, without being linked by any theory, it is believed that the anti-kogation elements react with metal ions, and create insoluble salts that precipitate and load the filters present in the printhead, and ultimately clog the flow of ink to the nozzles.

In some embodiments, inkjet ink composition of the present disclosure reduces the clogging phenomenon that can happen in internal ink channels, in firing chambers, or in nozzles. The composition of the present disclosure has a good affect on the filterability of the ink (i.e., the ink can be easily filtered). This property reflects the anti-clogging effect of the ink composition. Small-mesh filters are often used in the ink circulation system for preventing the above mentioned clogging at the narrow nozzle portion. However, this design encounters problem that the filters clog. Thus, by reducing the clogging effect, the composition of the present disclosure enhances therefore the filterability of the ink composition. Thus, in some embodiments, the composition offers a means to avoid filterability issues and/or potential nozzle clogging issues.

In some embodiments, the presence of anti-kogation agents and water soluble components, such as disclosed herein, reduces the amount of multivalent metal ion (such as calcium) presents in ink composition. Without being bound by any theory, it is believed that the efficiency of components to bind calcium reflects the anti-clogging effect and the filterability characteristics of ink compositions.

In addition, commonly used anti-kogation and anti-clogging components often aggressively corrode the surface of silicon materials exposed to ink, which would thus include most of the thermal inkjet die surfaces.

In some embodiments, the ink compositions are less aggressive to silicon surfaces and less silicon residues are thus found in ink compositions. Thus, ink compositions do not damage silicon present on the die of the print head. Thus, in some embodiments, the compositions offer a means to reduce the system impact due to the presence of free metal ions, while not degrading the thermal inkjet pen print head. Therefore, in some embodiments, the ink compositions present good anti-kogation property in combination with good anti-clogging properties while minimizing corrosion to silicon surfaces.

In addition, the composition of the present disclosure presents improved printing characteristics. Indeed, kogation and clogging problems tend to reduce drop velocity and drop weight and tend to reduce the efficiency of drop ejection. A loss of drop weight over the life of the inkjet pen reduces the color saturation or optical density of the inkjet ink on the print medium and, therefore, degrades print quality. Furthermore, a loss of drop weight over the life of the inkjet pen reduces the accuracy of drop placement on the print medium and, therefore, degrades print quality. Thus, by reducing the kogation and clogging phenomenon, the composition disclosed herein has improved printing characteristics. Thus, as examples, the ink composition improves drop velocity, and as other examples, improves efficiency of drop ejection.

In some embodiments, the present disclosure relates to methods of prolonging the service life of an inkjet print head, to be used for an inkjet recording method, including discharging ink from an orifice wherein the ink contains: an inkjet vehicle, from about 0.1 to about 10 weight percentage of colorants, from about 0.01 to about 10 weight percentage of anti-kogation agents, and from about 0.01 to about 6 weight percentage of a water soluble component such as defined herein.

In some embodiments, the pH of the ink composition may be varied as desired. In some embodiments, the pH of the ink ranges from about 3 to about 11, depending upon the type of colorant being used. In an example, the pH of the present ink is from about 5 to about 9 and, in another example, from about 5.5 to about 7.5 The pH of the ink compositions may be adjusted by the addition of organic or inorganic acids or bases, i.e., pH adjusting agent. Typical pH adjusting agent includes inorganic acids such as hydrochloric, phosphoric and sulfuric acids.

Typical organic acids include methane sulfonic, acetic and lactic acids. Typical inorganic bases include alkali metal hydroxides and carbonates. In some embodiments, pH adjusting agent is ammonium hydroxide. Any suitable amount of the pH adjusting agent can be used. In an example, the pH adjusting agent is used in an amount of from about 0.1 to about 1 percentage by weight, and, in another example, in an amount of from about 0.3 to about 0.7 percentage by weight of the composition.

In some embodiments, the ink compositions have a viscosity within the range of about 1.0 to about 10 cps, and, in other embodiments, of about 1.0 to about 7.0 cps, as measured at 25° C., in order to achieve the desired rheological characteristics. As indicated above, the viscosity of the ink composition is conveniently regulated, as known to those of ordinary skill in the art, for instance, by suitable choice of the quantity and the molecular weight of the binders resin, the organic solvent, the wax, and other agents.

In some embodiments, the inkjet ink composition includes a water soluble component represented by the formula (I):

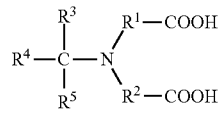

wherein $R^1$ and $R^2$ are, independently, $C_nH_{2n}$ with n being from 1 to 5; wherein $R^3$ is H or $C_nH_{2n+1}$ with n being from 1 to 4; wherein $R^4$ is H, COOH or $C_nH_{2n+1}$ with n being from 1 to 4; and wherein $R^5$ is H, COOH, OH, H, $C_nH_{2n}$COOH or $C_nH_{2n+1}$ with n being from 1 to 4.

In some embodiments, the water soluble component has the general formula (I) wherein: $R^1$ and $R^2$ are independently $C_nH_{2n\ with\ n\ being}$ 1; wherein $R^3$ is H or $C_nH_{2n+1}$ with n being 1; wherein $R^4$ is H, COOH, or $C_nH_{2n+1}$ with n being 1 and wherein $R^5$ is H, COOH, OH, H, $C_nH_{2n}$COOH or $C_nH_{2n+1}$ with n being 1 or 2.

In some other embodiments, the water soluble component has the general formula (I) wherein $R^1$ and $R^2$ are $C_nH_{2n}$ with n being 1; wherein $R^3$ is H; wherein $R^4$ is COOH and wherein $R^5$ is $C_nH_{2n}$COOH with n being 2.

In some embodiments, the water soluble component has the general formula (I) wherein $R^1$ and $R^2$ are $C_nH_{2n}$ with n being 1; wherein $R^3$ is H; wherein $R^4$ is H and wherein $R^5$ is $C_nH_{2n}$OH with n being 1.

In yet other embodiments, the water soluble component has the general formula (I) wherein $R^1$ and $R^2$ are $C_nH_{2n}$ with n being 1; wherein $R^3$ is H; wherein $R^4$ is $C_nH_{2n+1}$ with n being 1 and wherein $R^5$ is $C_nH_{2n}$OH with n being 1.

In some embodiments, the water soluble component, represented by the above formula (I), is present in an amount representing from about 0.01 to about 6 weight percentage by total weight of the ink composition. In some examples, the water soluble component, represented by the above formula (I), is present in an amount representing from about 0.10 to about 2 weight percentage by total weight of the ink composition.

In some embodiments, the inkjet ink composition includes anti-kogation agents. As anti-kogation agent, it is meant herein any components that prevent or reduce the kogation effect. The anti-kogation agent used in the ink composition may be an anionic surfactant, a nonionic surfactant, a zwitterionic surfactant, an amphoteric surfactant, or mixtures thereof.

As used herein, the term "amphoteric surfactant" refers to a surfactant that includes both cationic groups and anionic groups. If the amphoteric surfactant is present in an acidic environment, the amphoteric surfactant has cationic groups, while the amphoteric surfactant has anionic groups in a basic environment. At isoelectric point (IEP), the amphoteric surfactant has an overall neutral charge because both cationic groups and anionic groups are present.

As used herein, the term "zwitterionic surfactant" refers to a surfactant that includes both anionic groups and cationic groups and, therefore, has a neutral charge. The zwitterionic surfactant differs from the amphoteric surfactant in that the charge on the zwitterionic surfactant is not sensitive to changes in pH.

In some embodiments, the anti-kogation agent is an anionic surfactant. In other embodiments, the anti-kogation agent has a neutral charge. As such, the anti-kogation agent may be nonionic, amphoteric, or zwitterionic. In some embodiments, the ink composition has a neutral pH so that the anti-kogation agent has an overall neutral charge.

In some embodiments, the anti-kogation agent is a phosphate-containing surfactant, such as a phosphate ester surfactant. Examples of phosphate ester surfactants include, but are not limited to, surfactants that are commercially available under the tradename Emphos®, DeSophoS®, Hostaphat®, ESI-Terge®, Emulgen®, Crodafos®, Dephotrope®, and DePhOS®, which are available from Witco Corp. (Middlebury, Conn.), Clariant GmbH (Frankfurt, Germany), Cook Composites and Polymers Co., (Kansas City, Mo.), Kao Specialties Americas LLC (High Point, Nalco), Croda Inc. (Parsippay, N.J.), DeForest Enterprises, Inc. (Boca Raton, Fla.), and DeForest Enterprises, Inc. (Boca Raton, Fla.), respectively. Specific examples of phosphate ester surfactants that may be used include, but are not limited to, Crodafos®N-3 Acid, Emphos®9NP, Emphos®CS121, Emphos®CS131, Emphos®CS141, Emphos®CS1361, Hostaphat®LPKN, ESI-Terge®320, ESI-Terge®330, DePhoS®8028, Emulgen®BL-2PK, DeSophos4P, DeSophoS®6MPNa, DeSophoe8DNP, DeSophoS®9NP, DeSophoS®30NP or Dephotrope®CAS-MF. In addition, mixtures of these phosphate ester surfactants may be used.

In some embodiments of the present disclosure, the inkjet ink composition includes a phosphate-containing surfactant as anti-kogation agent. In some other embodiments, the anti-kogation agent is a phosphate ester surfactant. In yet some other embodiments, the anti-kogation agent is a phosphate ester of a fatty alcohol alkoxylate surfactant. In some embodiments, the phosphate ester of a fatty alcohol alkoxylate is a mixture of mono- and di-esters. In other embodiments, the phosphate ester of a fatty alcohol alkoxylate has an acid number ranging from 50 to 150. In some embodiments, the anti-kogation agent is an ethoxylated mono-oleyl phosphate ester.

The anti-kogation agent may be oleth-3 phosphate, a nonylphenol ethoxylate phosphate ester, a salt of a nonylphenol ethoxylate phosphate ester, an organo-phosphate, an aliphatic phosphate ester, a phosphated nonylphenoxy polyethoxy ethanol, or a salt of ethyl-hexanol ethoxylated phosphate ester (2EH-2EO). In other embodiments, the anti-kogation agent is selected from the group consisting of oleth-3 phosphate, oleth-10 phosphate, oleth-5 phosphate, dioleyl phosphate, ppg-5-ceteth-10 phosphate, $C_9$-$C_{15}$ alkyl monophosphate, deceth-4 phosphate, and mixtures thereof.

In other embodiments, the inkjet ink composition includes, as anti-kogation agent, an compound having the formula (II) below, wherein n is from 0 to 15.

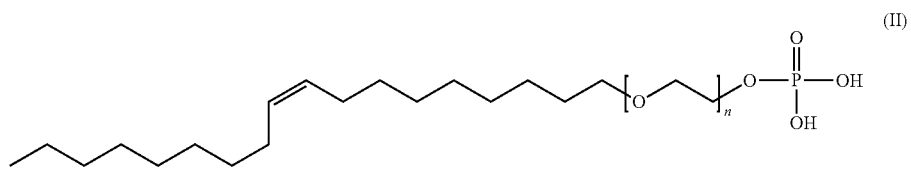

Examples of anti-kogation agent include surfactants of the Crodafos® family available from Croda Inc such as Crodafos®N3A, Crodafos®N3E, Crodafos®N10A, Crodafos®HCE and Crodafos®SG. Other examples of the phosphate-containing surfactants include Arlatone®Map 950 available from Croda Inc; Monofax® 831, Monofax®1214 available from Mona Industries; Monalube® 215 and Atlox®DP13/6 available from Croda Inc.

In some embodiments, the anti-kogation agent is present from about 0.01 to about 10 percentage by weight (wt %) of total weight of the ink composition. In some examples, the anti-kogation agent is present from about 0.2 to about 3 weight percentage. In other examples, the anti-kogation agent is present from about 0.4 to about 1 weight percentage of the total weight of the ink composition.

The ink composition includes one or more colorants that impart the desired color to the printed message. As used herein, "colorant" includes dyes, pigments, and/or other particulates that may be suspended or dissolved in an ink vehicle.

The colorant system is present in an amount of from about 0.1 to about 10 percentage by weight (wt %), in some examples, in an amount of from about 1 to about 6 percentage by weight, and in other examples, in an amount of from about 1 to about 4 percentage by weight of the ink composition. The colorant is generally present in an amount required to produce the desired contrast and readability.

In some embodiments, according to the present disclosure, the ink includes pigments as colorants. As used herein, "pigment" refers to a colorant particle that is substantially insoluble in the liquid vehicle in which it is used. Pigments can be dispersed using a separate dispersing agent, or can be self-dispersed, having a dispersing agent attached to the surface of the pigment.

As used herein, "self-dispersed" generally refers to pigments that have been functionalized with a dispersing agent, such as by chemical attachment of the dispersing agent to the surface of the pigment. The dispersing agent can be a small molecule or a polymer or oligomer. The dispersing agent can be attached to such pigments to terminate the outer shell of the pigment with a charge, thereby creating a repulsive nature that reduces agglomeration of pigment particles within the liquid vehicle. Another way to disperse carbon black is to surface treat the carbon (with ozone, as an example) to create charged functional groups on the surface of the carbon itself.

The pigments that can be used in accordance with embodiments of the present disclosure include both self-dispersed pigments as well as dispersed pigments, e.g., pigments dispersed by a separate dispersing agent that is not covalently attached to the surface. If self-dispersed, a dispersant is typically prepared in a precursor form, and then the precursor is attached to the pigment to chemically modify the surface of the pigment. In some embodiments, the dispersant can be attached to the pigment using various precursor materials, such as para-aminobenzoic acids, isophthalic acids, tricarboxylic acids, carboxylic groups, sulfonylic groups, phosphates, oligomers, polymers, and isomers thereof, for example.

As alluded to, pigment colorant can be used in accordance with embodiments of the present disclosure. Specifically, if black is used, the black pigment can be any commercially available black pigment that provides acceptable optical density and print characteristics. Such black pigments can be manufactured by a variety of known methods such as channel methods, contact methods, furnace methods, acetylene methods, or thermal methods, and are commercially available from such vendors as Cabot Corporation, Columbian Chemicals Company, Evonik, Mitsubishi, and E.I. DuPont de Nemours and Company. For example, commercially available carbon black pigments include Color Black FW 200, Color Black FW 2V, Color Black FW1, Color Black FW 18, Color Black FW S160, Color Black FW 5170, Printex including 95, 85, 75, 55, 45, 300, 35, 25, 200, 12, and Special Blacks including, 4A, 4, 5, 6, 550, 350, 250; BP1100, BP900, BP800, M1100, M900, M800, Monarch 1400, Monarch 1300, Monarch 1000, Monarch 900, Monarch 880, and Monarch 700; Cab-O-Jet 200 and Cab-O-Jet 300; Raven 2500ultra, Raven 2000, Raven 7000, Raven 5750, Raven 5250, Raven 5000, and Raven 3500; 45 B, and combinations thereof.

In addition to black, other pigment colorants can be used, such as cyan, magenta, yellow, blue, orange, green, pink, etc. Suitable organic pigments include, for example, azo pigments including diazo pigments and monoazo pigments, polycyclic pigments (e.g., phthalocyanine pigments such as phthalocyanine blues and phthalocyanine greens, perylene pigments, perynone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitropigments, nitroso pigments, anthanthrone pigments such as PR168, and the like. Representative examples of phthalocyanine blues and greens include copper phthalocyanine blue, copper phthalocyanine green and derivatives thereof (Pigment Blue 15 and Pigment Green 36). Representative examples of quinacridones include Pigment Orange 48, Pigment Orange 49, Pigment Red 122, Pigment Red 192, Pigment Red 202, Pigment Red 206, Pigment Red 209, Pigment Violet 19 and Pigment Violet 42. Representative examples of anthraquinones include Pigment Red 43, Pigment Red 194, Pigment Red 177, Pigment Red 216 and Pigment Red 226. Representative examples of perylenes include Pigment Red 123, Pigment Red 190, Pigment Red 189 and Pigment Red 224. Representative examples of thioindigoids include Pigment Red 86, Pigment Red 87, Pigment Red 198, Pigment Violet 36, and Pigment Violet 38. Representative examples of heterocyclic yellows include Pigment Yellow 1, Pigment Yellow 12, Pigment Yellow 13, Pigment Yellow 14, Pigment Yellow 17, Pigment Yellow 73, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Such pigments are commercially available in powder, press cake, or dispersion form from a number of sources.

The pigments of the present disclosure can be from about 5 nm to about 10 pm; in another example, the pigments can be from 10 nm to about 500 nm in size, although sizes outside this range can be used if the pigment can remain dispersed and provide adequate printing properties.

In some embodiments, the inks can include dyes as colorants. Examples of dyes suitable for use in the preparation of the ink composition include, but are not limited to, the yellow dyes such as C.I. Yellow 19 (C.I. 13900A), C.I. Yellow 21 (C.I. 18690), C.I. Yellow 61, C.I. Yellow 80, FD&C Yellow #5, and the like, the orange dyes such as C.I. Orange 1 (C.I. 11920), C.I. Orange 37, and the like, red dyes such as C.I. Solvent Red 8, C.I. Red 81, C.I. Solvent Red 82, and the like, pink dyes such as Diaresin Pink M (Mitsubishi Chemical Industries, Ltd.), and the like, violet dyes such as C.I. Solvent Violet 8, and the like, blue dyes such as C.I. Solvent Blue 2, C.I. Solvent Blue 11, and the like, black dyes such as C.I. Solvent Black 3, Acid Black 123, and the like. Some of the pigments and dyes are commercially available in convenient dispersions and may be used in the preparation of the ink composition according to embodiments of the present disclosure. In some embodiments, the ink includes a mixture of dyes and pigments as colorants.

As used herein, "liquid vehicle" is defined to include any liquid composition that is used to carry colorants, including pigments, to a substrate. A wide variety of liquid vehicle components may be used in accordance with embodiments of the present disclosure. Such liquid vehicle may include a mixture of a variety of different agents, including without limitation, other surfactants, solvent and co-solvents, buffers, biocides, viscosity modifiers and water. In some embodiments, the liquid vehicle is an inkjet liquid vehicle.

In some embodiments, organic solvents are part of the liquid vehicles. Organic solvents are typically used to increase the solubility or the dispersibility of the resin or of the colorant that might be present in the composition. Any suitable organic solvent can be used. Examples of suitable classes of organic solvents include the polar solvents such as amides, esters, ketones, lactones and ethers. Examples of suitable organic solvents thus include N-methylpyrrolidone (NMP), dimethyl sulfoxide, sulfolane, and glycol ethers. In some embodiments, the solvent is 2-pyrrolidone or a derivative of 2-pyrrolidone, such as 1-(2 hydroxyethyl)-2-pyrrolidone. In some other embodiments, the liquid vehicle includes a plurality of solvents.

As an example, the solvent is used in an amount representing of from about 0.1 to about 30 weight percentage of the ink composition and, in other embodiments, in an amount of from about 8 to about 25 weight percentage of the ink composition.

In some embodiments, the ink composition includes water. In some embodiments, water is used as the ink carrier for the composition and is part of the liquid vehicle. Generally, the water makes up the balance of the ink composition, and may be present in an amount representing from about 40 to about 90 weight percentage, in some embodiments representing from about 50 to about 80 weight percentage by weight of the total composition. In order to prevent the clogging of inkjet tip by dissolved salts in the water, deionized water may be used in the preparation of the ink composition.

In addition to water, various types of agents may be employed in the ink composition to optimize the properties of the ink composition for specific applications. For example, the ink composition may also include any number of buffering agents and/or biocides. Any number of commonly known buffers may be used to establish a desired pH level in the ink system. Additionally, in some embodiments, various biocides are used to inhibit growth of undesirable microorganisms. Several examples of suitable biocides include, but are in no way limited to, benzoate salts, sorbate salts, commercial products such as Nuosept® (ISP), Ucarcide® (Dow), Vancide® (RT Vanderbilt Co.), and Proxel® (Avecia), Kordek® MLX (Rohm and Haas) and other known biocides. Such biocides may be comprised in amount representing less than about 5 weight percentage of the ink composition. In some examples, biocides represents from about 0.05 to about 2 weight percentage of the ink composition.

In further detail with respect to the surfactant, the inkjet ink compositions can be substantially free of surfactant other than the phosphate-containing surfactant of the anti-kogation agent. However, certain second surfactants can also be used and may include standard water-soluble surfactants such as alkyl polyethylene oxides, alkyl phenyl polyethylene oxides, polyethylene oxide (PEO) block copolymers, acetylenic PEO, PEO esters, PEO amines, PEO amides, dimethicone copolyols, ethoxylated surfactants, fluorosurfactants, and mixtures thereof. In one example, a fluorosurfactant can be used as the second surfactant. In other examples, a secondary alcohol ethoxylated surfactant can be used. If used, the second surfactant can be present at from about 0.001 to about 10 weight percentage, and, in another example, can be present at from about 0.001 to about 0.1 weight percentage of the inkjet ink composition.

In some embodiments, the ink composition can contain latexes. Latexes include both latex particulates as well as the aqueous medium in which the latex particulates are dispersed. Latex is a liquid suspension including a liquid (such as water and/or other liquids) and polymeric particulates from about 20 nm to about 500 nm in size. As an example, the polymeric particulate can be present in the liquid at from about 0.5 to about 20 weight percentage. Such polymeric particulates can include a plurality of monomers that are typically randomly polymerized, and can be crosslinked.

Any latex polymer commercially available can be used in the inks of the present disclosure including self-dispersed and functionalized latex polymers. Latex polymers can be prepared using any of a number of known emulsion polymerization techniques where co-monomers are dispersed and polymerized in a discontinuous phase of an emulsion. Monomers that are often used include ethyl acrylate; ethyl methacrylate; benzyl acrylate; benzyl methacrylate; propyl acrylate; propyl methacrylate; iso-propyl acrylate; iso-propyl methacrylate; butyl acrylate; butyl methacrylate; hexyl acrylate; hexyl methacrylate; octadecyl methacrylate; octadecyl acrylate; lauryl methacrylate; lauryl acrylate; hydroxyethyl acrylate; hydroxyethyl methacrylate; hydroxyhexyl acrylate; hydroxyhexyl methacrylate; hydroxyoctadecyl acrylate; hydroxyoctadecyl methacrylate; hydroxylauryl methacrylate; hydroxylauryl acrylate; phenethyl acrylate; phenethyl methacrylate; 6-phenylhexyl acrylate; 6-phenylhexyl methacrylate; phenyllauryl acrylate; phenyllauryl methacrylate; 3-nitrophenyl-6-hexyl methacrylate; 3-nitrophenyl-18-octadecyl acrylate; ethyleneglycol dicyclopentyl ether acrylate; vinyl ethyl ketone; vinyl propyl ketone; vinyl hexyl ketone; vinyl octyl ketone; vinyl butyl ketone; cyclohexyl acrylate; methoxysilane; acryloxypropyhiethyl-dimethoxysilane; trifluoromethyl styrene; trifluoromethyl acrylate; trifluoromethyl methacrylate; tetrafluoropropyl acrylate; tetrafluoropropyl methacrylate; heptafluorobutyl methacrylate; iso-butyl acrylate; iso-butyl methacrylate; 2-ethylhexyl acrylate; 2-ethylhexyl methacrylate; iso-octyl acrylate; and iso-octyl methacrylate.

As an example, the ink composition of the present disclosure can be used in a method of forming printed images on surfaces in a heated environment. The method includes projecting a stream of droplets of the ink composition onto a surface to form the desired printed image. The inkjet ink composition may be established on the substrate via any suitable inkjet printing techniques. Non-limiting examples of such inkjet printing techniques include thermal, acoustic, and piezoelectric inkjet printing. In some embodiments, the inks are utilized in thermal inkjet printers.

An example of method of inkjet printing over a prolonged period of time, includes jetting an inkjet ink onto a media substrate, wherein the inkjet ink includes: an inkjet vehicle, from about 0.1 to about 10 weight percentage of colorants, from about 0.01 to about 10 weight percentage of anti-kogation agents, and from about 0.01 to about 6 weight percentage of a water soluble component. Such water soluble component is represented by formula (I):

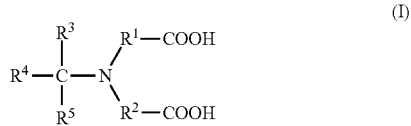

wherein $R^1$ and $R^2$ are independently $C_nH_{2n}$ with n being from 1 to 5; wherein $R^3$ is H or $C_nH_{2n+1}$ with n being from 1 to 4; wherein $R^4$ is H, COOH or $C_nH_{2n+1}$ with n being from 1 to 4 and wherein $R^5$ is H, COOH, OH, H, $C_nH_{2n}$COOH or $C_nH_{2n+1}$ with n being from 1 to 4.

An example of method of prolonging the service life of the inkjet print head includes discharging ink from an orifice wherein the ink contains an inkjet vehicle, from about 0.1 to about 10 weight percentage of colorants, from about 0.01 to about 10 weight percentage of anti-kogation agents, and from about 0.01 to about 6 weight percentage of a water soluble component such as defined above.

Another example of method of inkjet printing over a prolonged period of time, includes jetting an inkjet ink onto a media substrate, wherein the inkjet ink includes: an inkjet vehicle, from about 0.1 to about 10 weight percentage of colorants, from about 0.01 to about 10 weight percentage of anti-kogation agent having the formula (II) wherein n is from 0 to 15:

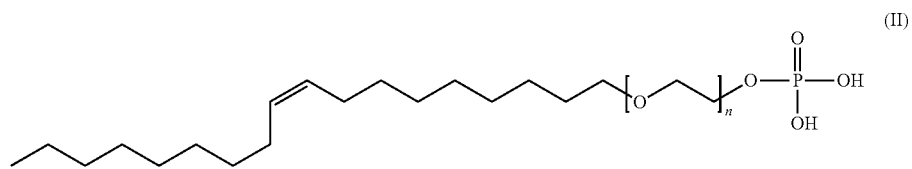

and from about 0.01 to about 6 weight percentage of a water soluble component represented by formula (I):

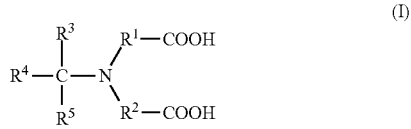

wherein $R^1$ and $R^2$ are $C_nH_{2n}$ with n being 1; $R^3$ is H; $R^4$ is H and $R^5$ is $C_nH_{2n}$OH with n being 1.

The introduction of a combination of anti-kogation agents and water soluble components such as disclosed herein reduces kogation phenomenon of resistors and, in addition, ameliorates or even substantially eliminates clogging phenomenon that can happen in internal ink channels, in firing chambers or in nozzles of the printhead. The use of such ink compositions extends thus the life of inkjet pens in general (and particularly thermal inkjet pens) which carry such inks.

The images are printed on porous and non-porous surfaces, in some embodiments on porous surfaces, using the ink composition of embodiments of the present disclosure. In other embodiments, the substrate is paper (non-limitative examples of which include plain copy paper or papers having recycled fibers therein) or photo-paper (non-limitative examples of which include polyethylene or polypropylene extruded on one or both sides of paper), and/or combinations thereof. In some embodiments, the substrate has a thickness along substantially the entire length ranging between about 0.025 mm and about 0.5 mm. In some embodiments, the printed surface can be any plastic coated media (as used in out-door signage) and tracing media (for architectural drawings).

As used herein, "images" refers to marks, signs, symbols, figures, indications, and/or appearances deposited upon a substrate with either visible or an invisible ink composition. Examples of an image can include characters, words, numbers, alpha-numeric symbols, punctuation, text, lines, underlines, highlights, and the like.

In other embodiments, the inks are utilized in an inkjet set including, at least, magenta, cyan, yellow and black inks. Colorless ink compositions that contain non-colored particles and no colorant may also be used.

The following examples illustrate the embodiments of the disclosure that are presently best known. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following examples provide further details in connection with what are presently deemed to be the most practical and preferred embodiments of the invention.

EXAMPLE 1

Ink Formulations

Ink compositions are prepared in accordance with Table A as follows. All numbers represent the weight percentage of each component by total weight of the ink composition. Ink formulations G and H are comparative inks.

TABLE A

| Formulations: | A | B | C | D | E | F | G | H |
|---|---|---|---|---|---|---|---|---|
| 1-(2 hydroxyethyl)-2-pyrrolidone | 8.00 | 8.00 | 8.00 | 8.00 | 8.00 | 8.00 | 8.00 | 8.00 |
| 2-pyrrolidone | 7.00 | 7.00 | 7.00 | 7.00 | 7.00 | 7.00 | 7.00 | 7.00 |
| 1,6-Hexanediol | 3.00 | 3.00 | 3.00 | 3.00 | 3.00 | 3.00 | 3.00 | 3.00 |
| Tetraethylene Glycol | 3.00 | 3.00 | 3.00 | 3.00 | 3.00 | 3.00 | 3.00 | 3.00 |
| Liponic ® EG-1 | 2.00 | 2.00 | 2.00 | 2.00 | 2.00 | 2.00 | 2.00 | 2.00 |
| Surfynol ® SEF | 1.10 | 1.10 | 1.10 | 1.10 | 1.10 | 1.10 | 1.10 | 1.10 |
| Crodafos ® N-3 | 1.00 | 1.00 | 1.00 | 1.00 | 1.00 | 1.00 | 1.00 | — |
| Proxel ® GXL | 0.10 | 0.10 | 0.10 | 0.10 | 0.10 | 0.10 | 0.10 | 0.10 |
| Kordek ® MLX | 0.14 | 0.14 | 0.14 | 0.14 | 0.14 | 0.14 | 0.14 | 0.14 |
| Joncryl ® 683 (K salt) | 2.00 | 2.00 | 2.00 | 2.00 | 2.00 | 2.00 | 2.00 | 2.00 |
| Dissolvine ® EDG | 0.20 | — | — | 0.10 | — | — | — | — |
| Triton ® M | — | 0.20 | — | — | 0.10 | — | — | — |

TABLE A-continued

| Formulations: | A | B | C | D | E | F | G | H |
|---|---|---|---|---|---|---|---|---|
| Dissolvine ® 45 S | — | — | 0.20 | — | — | 0.10 | — | — |
| Magenta colorant | 3.00 | 3.00 | 3.00 | 3.00 | 3.00 | 3.00 | 3.00 | 3.00 |
| Water | Up to 100 | Up to 100 | Up to 100 | Up to 100 | Up to 100 | Up to 100 | Up to 100 | Up to 100 |

Surfynol ® SEF is a surfactant available from Air Products. Joncryl ® 683 is an acrylic resin available from Johnson Wax. Proxel ® GXL is a Biocide available from Zeneca. Crodafos ® N-3 acid is available from Croda Inc. Liponic ® EG-1 is a surfactant available from Dow Corning. Kordek ® MLX is a biocide available from Rohm and Haas. Dissolvine ® EDG and Dissolvine ® 45 S are available from AkzoNobel Corp. Trilon ® M is available from BASF Corp.

EXAMPLE 2

Kogation Performance of Ink Compositions

Ink compositions are evaluated for their efficacy in reducing kogation. Inkjet inks formulation A, G and H are loaded into 3 different thermal inkjet architectures and fired initially for baseline readings related to steady state drop weight. Each ink composition is printed through its respective print architecture at 200 million drops per nozzle. The nozzle size for this particular study is about 20 microns.

The kogation performance is determined by measuring the drop velocity and/or drop weight retained after significant volume of ink firing. The kogation test is carried out with multiple repeating pens for average result.

The drop velocity (DV), expressed in m/s, is determined for each of ink compositions A, G and H at 0, 1, 10, 50, 100, and 200 million drops/nozzle. The results are expressed in Table B below and illustrated in FIG. 1.

TABLE B

| Millions of Drops per nozzles | Composition H | Composition G | Composition A |
|---|---|---|---|
| 1 | 8.7 | 11.2 | 11.2 |
| 10 | 3.1 | 11.3 | 11.1 |
| 50 | 3.1 | 11.1 | 11.0 |
| 100 | 2.7 | 11.2 | 10.8 |
| 200 | 2.5 | 11.1 | 10.8 |

As shown in FIG. 1, the control ink composition H shows no or marginal kogation performances. A significant decrease in the drop velocity is observed over the course of firing 10 million drops/nozzle. On the opposite, ink compositions A and G show good kogation performances.

EXAMPLE 3

Filterability Performances of Ink Compositions

The formulations of Table A are analyzed for their filterability features. The filterability performance represents the anti-clogging benefit of the ink compositions, i.e., the ability of not clogging the nozzles and the filters present of the printhead.

Figure 2:
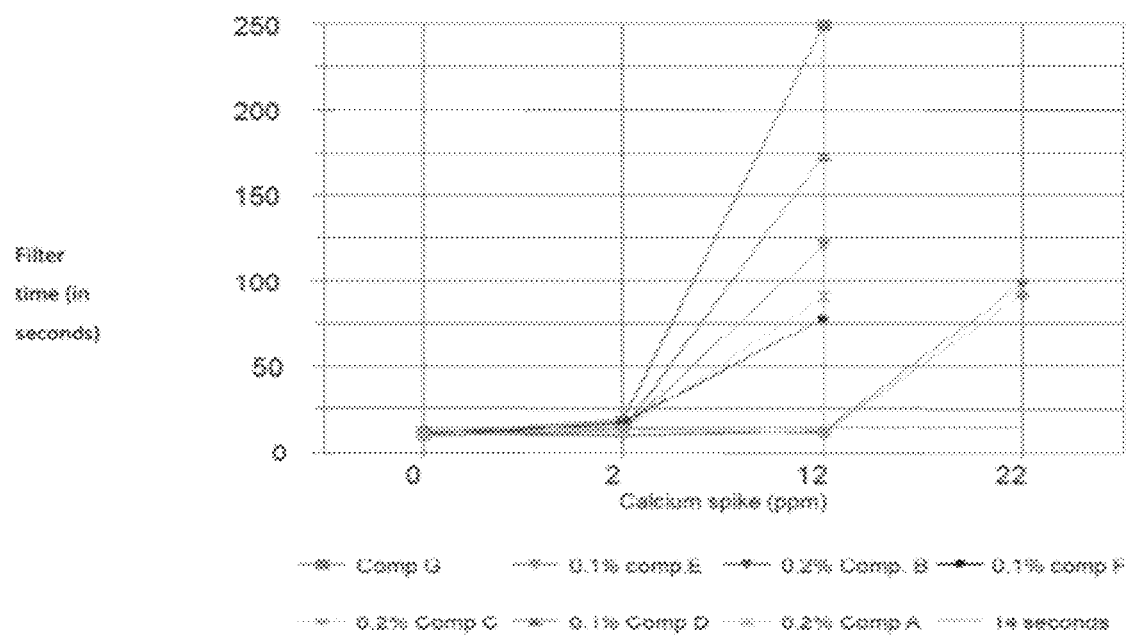
FIG. 2 is a comparative graph representing the average filter time in relation with amount of calcium for ink compositions according to embodiments of the present disclosure.

The filtration time of each ink is evaluated by putting 15 g of each ink through a 1 μm pore size filter. The ink is then spiked with a metal-salt solution ($Ca^{2+}$). Such addition of calcium is supposed to boost the formation of precipitate that will clog the filter. The filterability represents the tendency of ink to clog, the lower the filter time is, the better the anti-clogging effect is. The results are summarized in the chart illustrated in FIG. 2.

The results demonstrate that the combination of anti-kogation agents and of water soluble components represented by formula (I) results in ink composition that does not present clogging effect.

The preceding description has been presented only to illustrate and describe exemplary embodiments of the present invention. Although certain example methods, compositions, apparatus and articles of manufacture have been described herein, the scope of coverage of this patent is not limited thereto. On the contrary, this patent covers all methods, apparatus and articles of manufacture fairly falling within the scope of the claims either literally or under the doctrine of equivalents.

What is claimed is:

1. An inkjet ink composition comprising:
    a. an inkjet vehicle,
    b. from about 0.1 to about 10 weight percentage of colorants,
    c. from about 0.01 to about 10 weight percentage of anti-kogation agents,
    d. and from about 0.2 to about 6 weight percentage of a water soluble component represented by formula (I):

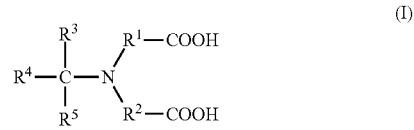

wherein $R^1$ and $R^2$ are independently $C_nH_{2n}$ with $n$ being form 1 to 5; wherein $R^3$ is H or $C_nH_{2n+1}$ with $n$ being form 1 to 4; wherein $R^4$ is H, COOH or $C_nH_{2n+1}$ with $n$ being form 1 to 4 and wherein $R^5$ is H, COOH, OH, $C_nH_{2n}$COOH, $C_nH_{2n}$OH or $C_nH_{2n+1}$ with $n$ being form 1 to 4.

2. The inkjet ink according to claim 1 wherein, in the general formula (I), $R^1$ and $R^2$ are $C_nH_{2n}$ with n being 1; wherein $R^3$ is H; wherein $R^4$ is COOH and wherein $R^5$ is $C_nH_{2n}$COOH with n being 2.

3. The inkjet ink according to claim 1 wherein, in the general formula (I), $R^1$ and $R^2$ are $C_nH_{2n}$ with n being 1; $R^3$ is H; $R^4$ is H and $R^5$ is $C_nH_{2n}$OH with n being 1.

4. The inkjet ink according to claim 1 wherein, in the general formula (I), $R^1$ and $R^2$ are $C_nH_{2n}$ with n being 1; $R^3$ is H; $R^4$ is $C_nH_{2n+1}$ with n being 1 and $R^5$ is $C_nH_{2n}$OH with n being 1.

5. The inkjet ink according to claim 1 wherein the water soluble component represented by formula (I), is present in an amount representing from about 0.10 to about 2 weight percentage by weight of the ink composition.

6. The inkjet ink according to claim 1 wherein the anti-kogation agent is a phosphate-containing surfactant.

7. The inkjet ink according to claim 1 wherein the anti-kogation agent is a phosphate ester surfactant.

8. The inkjet ink according to claim 1 wherein the anti-kogation agent is a phosphate ester of a fatty alcohol alkoxylate surfactant.

9. The inkjet ink according to claim 1 wherein the anti-kogation agent is an ethoxylated mono-oleyl phosphate ester surfactant.

10. The inkjet ink according to claim 1 wherein the anti-kogation agent is selected from the group consisting of oleth-3 phosphate, oleth-10 phosphate, oleth-5 phosphate, dioleyl phosphate, ppg-5-ceteth-10 phosphate, $C_9$-$C_{15}$ alkyl monophosphate, deceth-4 phosphate, and mixtures thereof.

11. The inkjet ink according to claim 1 wherein the anti-kogation agent has the formula (II) wherein n is from 0 to 15:

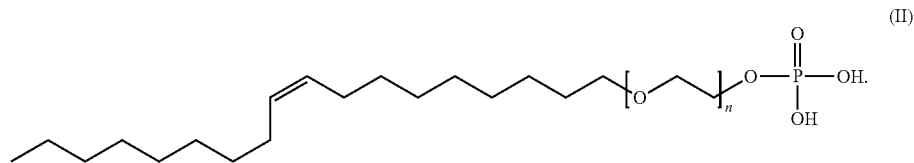

12. The inkjet ink of claim 1, wherein the anti-kogation agent is present in an amount representing from about 0.2 to about 3 weight percentage by weight of the ink composition.

13. The inkjet ink according to claim 1 wherein the colorant is a pigment.

14. The inkjet ink according to claim 1 wherein the water soluble component represented by formula (I) is present in an amount representing from about 0.20 to about 2 weight percentage by weight of the ink composition.

15. The inkjet ink according to claim 1, wherein the anti-kogation agent is oleth-3 phosphate present in an amount of about 1 weight percentage.

16. A method of inkjet printing over a prolonged period of time, comprising jetting an inkjet ink onto a media substrate, wherein said inkjet ink includes:
   a. an inkjet vehicle,
   b. from about 0.1 to about 10 weight percentage of colorants,
   c. from about 0.01 to about 10 weight percentage of anti-kogation agents, d. and from about 0.2 to about 6 weight percentage of a water soluble component represented by formula (I):

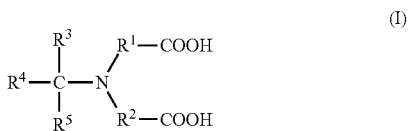

wherein $R^1$ and $R^2$ are independently $C_nH_{2n}$ with $n$ being form 1 to 5; wherein $R^3$ is H or $C_nH_{2n+1}$ with $n$ being form 1 to 4; wherein $R^4$ is H, COOH or $C_nH_{2n+1}$ with $n$ being form 1 to 4 and wherein $R^5$ is H, COOH, OH, $C_nH_{2n}COOH$, $C_nH_{2n}OH$ or $C_nH_{2n+1}$ with $n$ being form 1 to 4.

17. A method of inkjet printing over a prolonged period of time, comprising jetting an inkjet ink into a media substrate, wherein said inkjet ink includes:
   a. an inkjet vehicle,
   b. from about 0.1 to about 10 weight percentage of colorants,
   c. from about 0.01 to about 10 weight percentage of anti-kogation agents having the formula (II) wherein n is from 0 to 15:

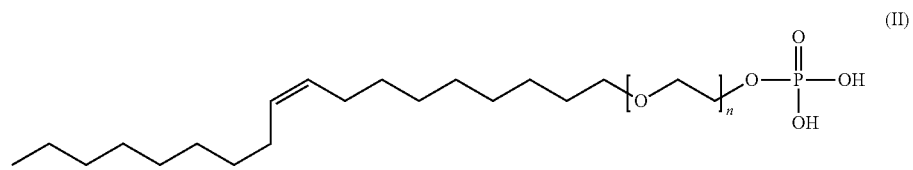

d. and from about 0.2 to about 6 weight percentage of a water soluble component represented by formula (I):

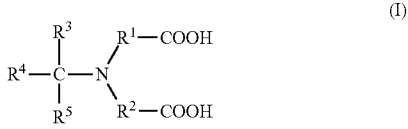

wherein $R^1$ and $R^2$ are independently $C_nH_{2n}$ with $n$ being form 1 to 5; wherein $R^3$ is H; wherein $R^4$ is $C_nH_{2n+1}$ with $n$ being 1 and $R^5$ is $C_nH_{2n}OH$ with $n$ being 1.

* * * * *